(12) United States Patent
Curry

(10) Patent No.: US 11,503,835 B2
(45) Date of Patent: *Nov. 22, 2022

(54) FOOD BRINER

(71) Applicant: Jon K Curry, Chino Valley, AZ (US)

(72) Inventor: Jon K Curry, Chino Valley, AZ (US)

( * ) Notice: Subject to any disclaimer, the term of this patent is extended or adjusted under 35 U.S.C. 154(b) by 279 days.

This patent is subject to a terminal disclaimer.

(21) Appl. No.: 16/849,147

(22) Filed: Apr. 15, 2020

(65) Prior Publication Data

US 2020/0236956 A1     Jul. 30, 2020

Related U.S. Application Data

(63) Continuation of application No. 15/530,374, filed on Jan. 4, 2017, now Pat. No. 10,653,159.

(60) Provisional application No. 62/387,758, filed on Jan. 4, 2016.

(51) Int. Cl.
    *A23B 4/26* (2006.01)
    *A23B 4/023* (2006.01)

(52) U.S. Cl.
    CPC ............... *A23B 4/26* (2013.01); *A23B 4/023* (2013.01); *A23V 2002/00* (2013.01)

(58) Field of Classification Search
    CPC .... A47B 77/08; A47B 77/022; A47J 37/1209; A47J 37/1266; A47J 37/1295
    USPC .......... 99/330, 403, 418, 483, 535; 220/306, 220/601, 605, 628, 630, 631, 637, 645, 220/661, 676
    See application file for complete search history.

(56) References Cited

U.S. PATENT DOCUMENTS

| | | | |
|---|---|---|---|
| 2,614,401 A | 10/1952 | Roberts | |
| 3,289,664 A | 12/1966 | Hewitt | |
| 5,232,120 A * | 8/1993 | Dunken | B65D 47/121 206/508 |
| 2008/0223222 A1* | 9/2008 | Palamara | A47J 27/09 220/573.1 |
| 2009/0087534 A1 | 4/2009 | McLemore | |
| 2009/0255927 A1 | 10/2009 | Flecknoe-Brown | |

* cited by examiner

*Primary Examiner* — Phuong T Nguyen
(74) *Attorney, Agent, or Firm* — One LLP

(57) ABSTRACT

Brining apparatus includes a refrigerator, a sink, and a hollow housing to receive brining fluid and a turkey. The housing has an open mouth at the top. The apparatus also includes a cover which sealingly removably engages the mouth of the housing. The housing includes a valve to drain brining liquid from the housing. The housing and cover are shaped and dimensioned, when assembled, to fit in the refrigerator for cooling, and to fit in the sink to drain brining liquid from the housing.

4 Claims, 5 Drawing Sheets

FOOD BRINER

RELATED APPLICATIONS

The present application is a continuation of U.S. patent application Ser. No. 15/530,374 filed Jan. 4, 2017, which in turn claims priority to U.S. Provisional Patent Application Ser. No. 62/387,758 filed Jan. 4, 2016.

BACKGROUND OF THE INVENTION

This invention relates to moisturizing meat and other foodstuffs.

More particularly, the invention relates to a method and apparatus to brine a turkey and other meats and foodstuffs.

Those of skill in the art have long endeavored to provide improved methods and apparatus to prepare meals.

Accordingly, it would be highly desirable to provide improved food preparation methods and apparatus.

Therefore, it is a principal object of the invention to provide an improved food preparation method and apparatus.

DETAILED DESCRIPTION OF THE DRAWINGS

This, and other and further objects of the invention, will be apparent to those of skill in the art based on the following detailed description thereof, taken in conjunction with the Drawings, in which.

DETAILED DESCRIPTION OF THE INVENTION

Briefly, in accordance with the invention, provided is improved apparatus to brine a turkey. The apparatus comprises a refrigerator with a housing and a door. The housing includes an interior with at least one shelf. The door is movable between a first closed position and a second open position. The apparatus also includes a sink with a drain and a faucet and at least one valve controlling the flow of water through the faucet. The apparatus also includes free standing moisturizing apparatus to store temporarily a turkey in brining fluid. The moisturizing apparatus comprises a hollow housing to receive brining fluid and a turkey. The housing comprises a top with an open mouth, a closed bottom to set on a horizontally oriented surface, and normally vertically oriented sides extending intermediate said top and bottom. The moisturizing apparatus also comprises a cover shaped and dimensioned to engage the top to seal closed the mouth; and, a drain valve construct in the bottom of the moisturizing apparatus. The drain valve has a primary closed operative position in which the housing retains brining fluid, and, a secondary open position in which brining fluid drains from the housing through the valve. The moisturizing apparatus is shaped and dimensioned to set in the sink to drain brining fluid from the housing into the sink when the drain valve is in the secondary open position; and fit, when the door is in the first closed position, on the shelf in the interior of the refrigerator with the sides of the moisturizing apparatus in a generally horizontal orientation.

Figure 1:
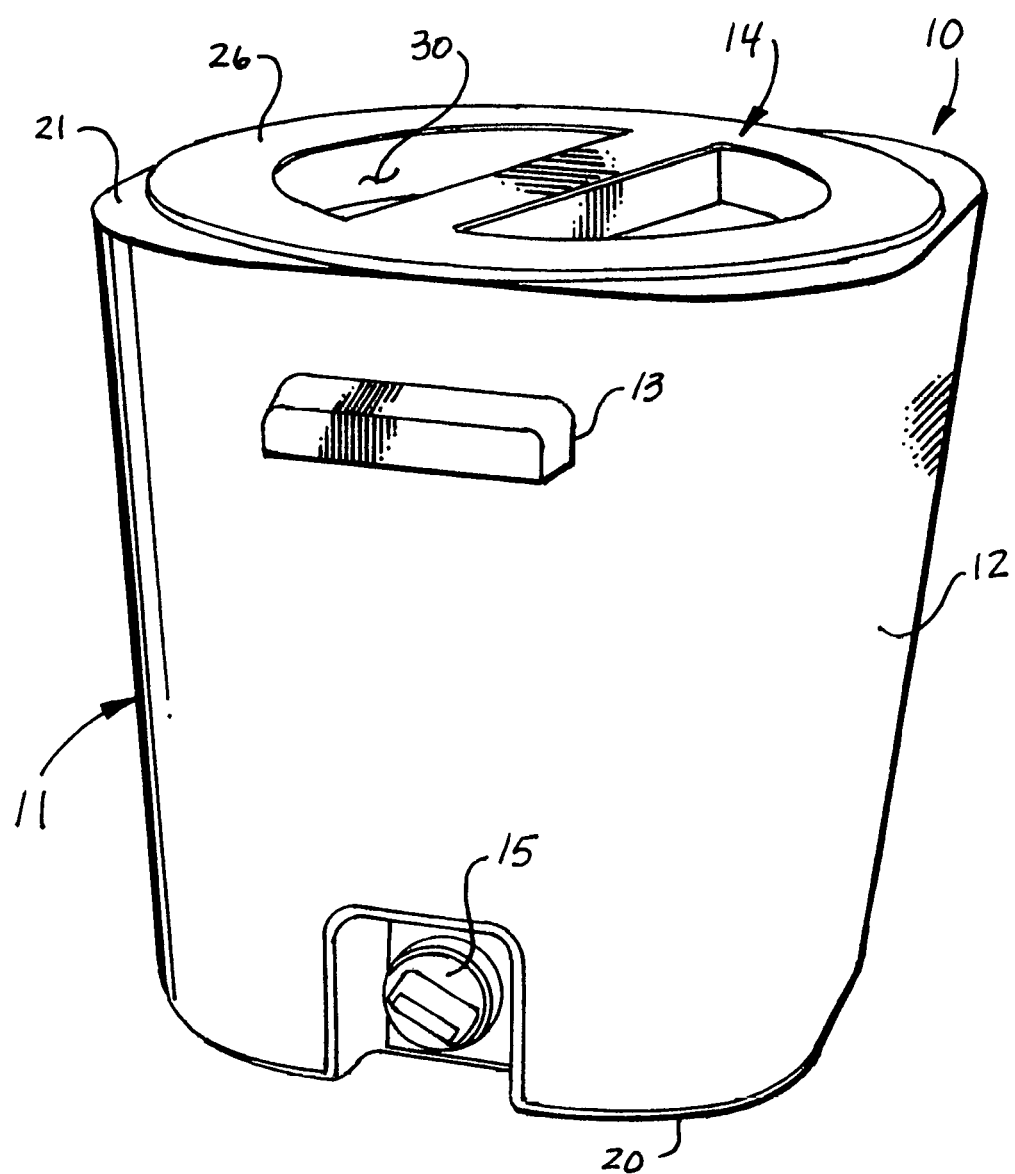
FIG. 1 is a perspective view illustrating brining apparatus constructed in accordance with the invention.

Turning now to the Drawings which depict presently preferred embodiments for the purpose of illustration and not by way of limitation of the invention, and in which like reference characters refer to corresponding elements throughout the several views, FIG. 1 illustrates free standing moisturizing apparatus, generally indicated by reference character 10, used to brine and moisturize a turkey or other meats or foodstuffs. Moisturizing apparatus 10 comprises a hollow housing 11 to receive brining fluid and a turkey. Housing 11 includes generally horizontally oriented bottom 20, a top with generally horizontally oriented surface 21 and internally threaded mouth 16 (FIG. 2), and sides 12 extending intermediate the top and bottom 20 of housing 11. Handles 13 are fixedly attached to the exterior of housing 11 on opposing sides of housing 11. At least one drain valve 15 is provided at the bottom of housing 11 to drain, when desired, brining fluid from within housing 11. When moisturizing apparatus 10 is free standing in the manner depicted in FIG. 1, sides 12 normally are vertically oriented and the top and bottom 20 are normally horizontally oriented in the manner illustrated in FIG. 1. At least one of sides 12 is flat, or the exterior of housing 11 is otherwise shaped and dimensioned, such that when apparatus 10 is placed on the flat side, apparatus 10 will not roll.

External threads 19 on cover 14 (FIG. 2) turn into internally threaded mouth 16 to sealingly engage the threads in mouth 16 such that in the event there is brining fluid in housing 11 and apparatus 10 is turned on its side, brining fluid will not leak out between cover 14 and mouth 16. When cover 14 is turned into mouth 16 in the manner illustrated in FIG. 1, lower surface 25 on cover 14 is adjacent and may contact surface 21 on the top of housing 11.

A pair of semicircular inserts or detents 30 in upper surface 26 of cover 14 permit a user to grasp with his fingers the upstanding rib dividing the detents and to turn cover 14.

Figure 2:
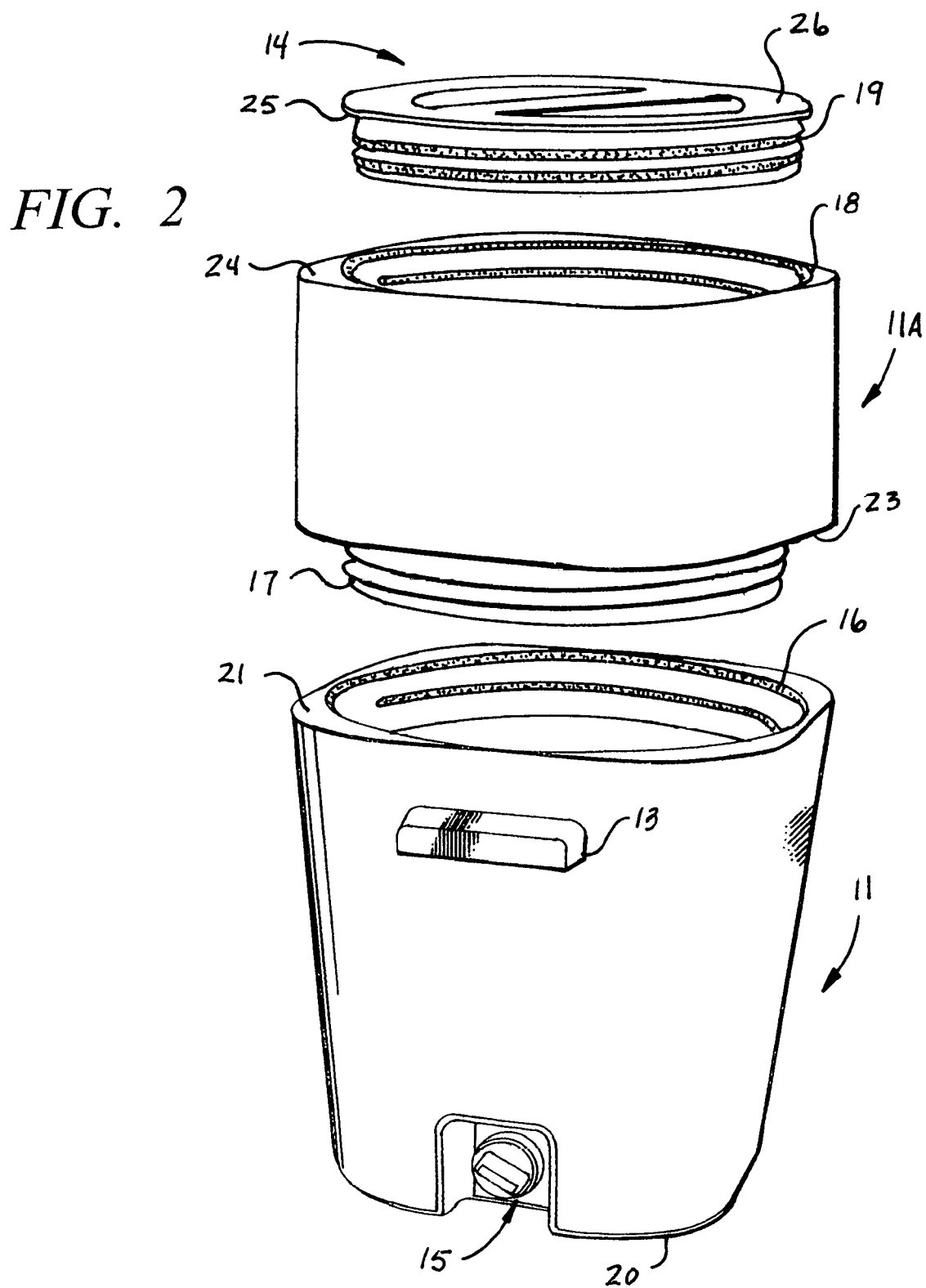
FIG. 2 is a perspective exploded view illustrating an alternate embodiment of brining apparatus constructed in accordance with the invention.

In FIG. 2, cover 14 is removed from housing 11 and housing extension 11A is depicted intermediate cover 14 and housing 11. External threads 17 on housing extension 11A are shaped and dimensioned to turn into and sealingly engage the threads in mouth 16 such that generally horizontally oriented lower flange surface 23 is adjacent and may contact surface 21 of housing 11. External threads 19 of cover 14 turn into internally threaded mouth 18 of housing extension 11A to sealingly engage the threads in mouth 18 such that in the event there is brining fluid in housing 11 and extension 11A, brining fluid will not leak out between cover 14 and mouth 18 or between threads 17 and mouth 16. When cover 14 is turned into mouth 16 in the manner illustrated in FIG. 3, lower surface 25 on cover 14 is adjacent and may contact surface 24 on the top of extension 11A.

Figure 3:
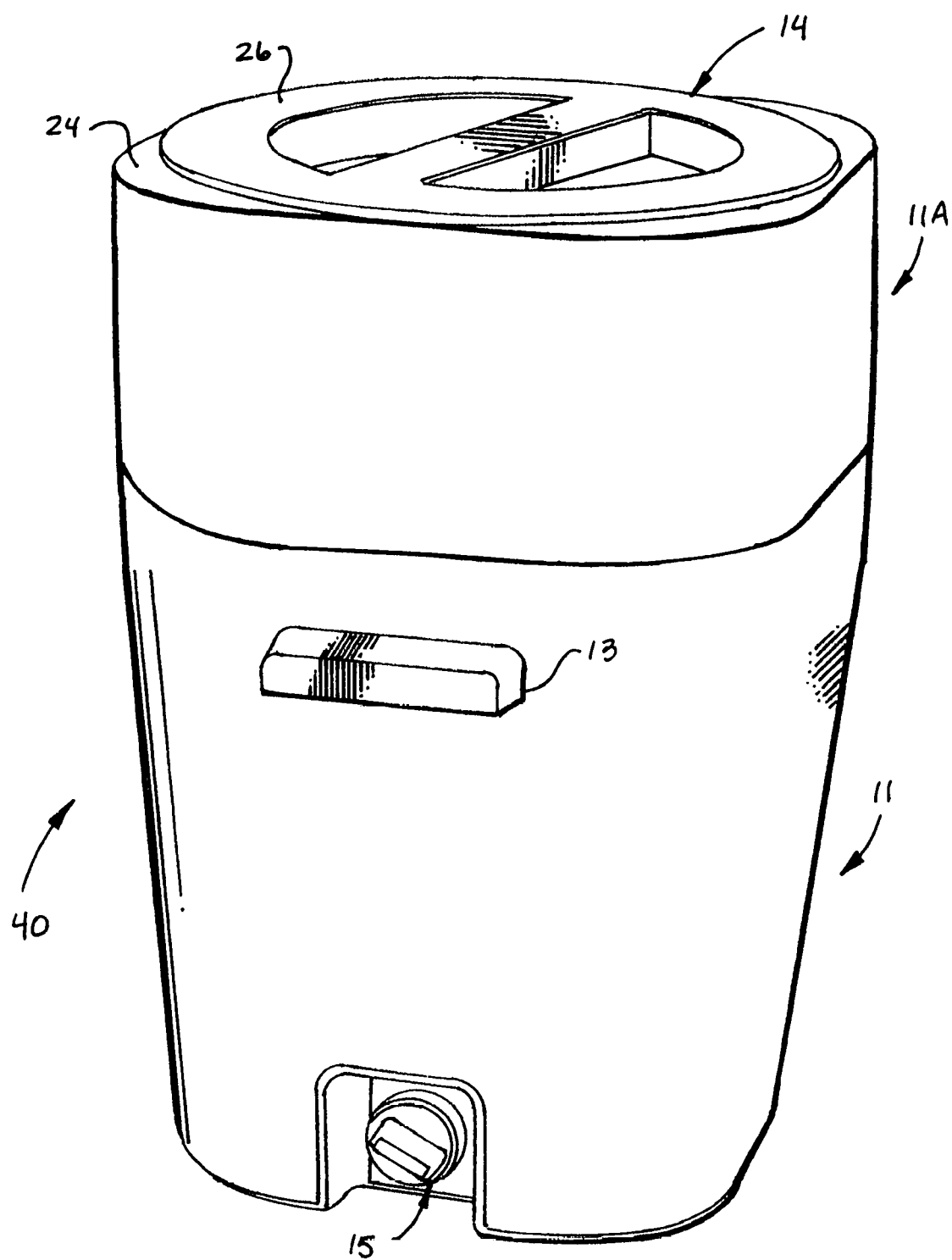
FIG. 3 is a perspective view illustrating the apparatus of FIG. 2 assembled.

FIG. 3 illustrates cover 14, extension 11A, and housing 11 assembled. In FIG. 3, threads 19 on cover 14 are turned into and sealingly engage mouth 18, and, threads 17 on extension 11A are turned into and sealingly engage mouth 16.

Figure 4:
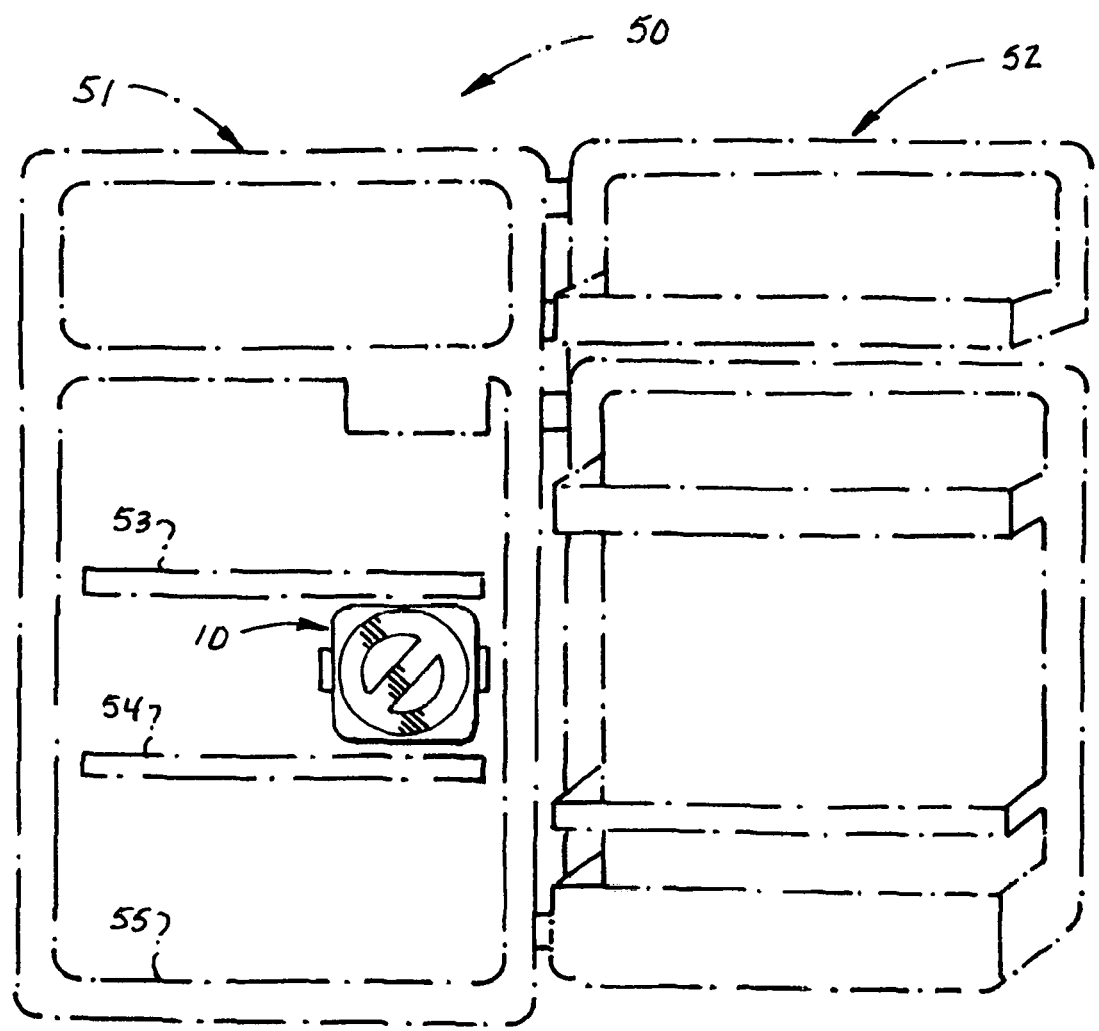
FIG. 4 is a perspective view further illustrating brining apparatus constructed in accordance with the invention.

In FIG. 4, refrigerator 50 includes housing 51 with an interior including at least one shelf 53, 54, and 55. Shelf 55 comprises the bottom of the interior of refrigerator 50. Shelves 53 and 54 can, in conventional fashion, be removed from the interior of refrigerator 50 to increase the size of the "open" space on the interior of the refrigerator 50. "Open" space is space which is free from shelves and/or drawers or other structures which extend outwardly from the back wall of the interior of refrigerator 50 and extend into the interior space of refrigerator 50. In FIG. 4, the height of open space between shelves 53 and 54 is less than the height of open space between shelves 54 and 55. Door 52 is pivotally mounted on housing 51 in conventional fashion. Door 52 moves between a closed position which covers and seals the interior of refrigerator 50, and, an open position illustrated in FIG. 4. In the open position, door 52 does not cover and seal the interior of refrigerator 50, but instead uncovers the interior of refrigerator 50 to permit ready access to the interior of the refrigerator. Moisturizing apparatus 10 is shaped and dimensioned to fit, when door 52 is closed, on at least one shelf 53 to 55 and in an open space on the interior of refrigerator 50. This is a critical feature of the invention because it permits ready storage of moisturizing apparatus 10 (or, if desired, apparatus 40 shown in FIG. 3) in a cooled location. Being able to turn moisturizing apparatus 10 on its side in a refrigerator 50 in the manner shown in FIG. 4 is also a critical feature of the invention because it to facilitates insertion of apparatus 10 in a refrigerator to cool a turkey and brining fluid in apparatus 10. Accordingly, apparatus 10 is shaped and dimensioned to fit in a selected open space on the interior of a refrigerator 50 (in the free standing orientation of FIG. 1 and/or in the "on-its-side" orientation of FIG. 4), or, the refrigerator 50 is sized to accept apparatus 10 and/or 40 in the free standing orientation of FIG. 1 and/or the "on-its-side" orientation of FIG. 4.

Figure 5:
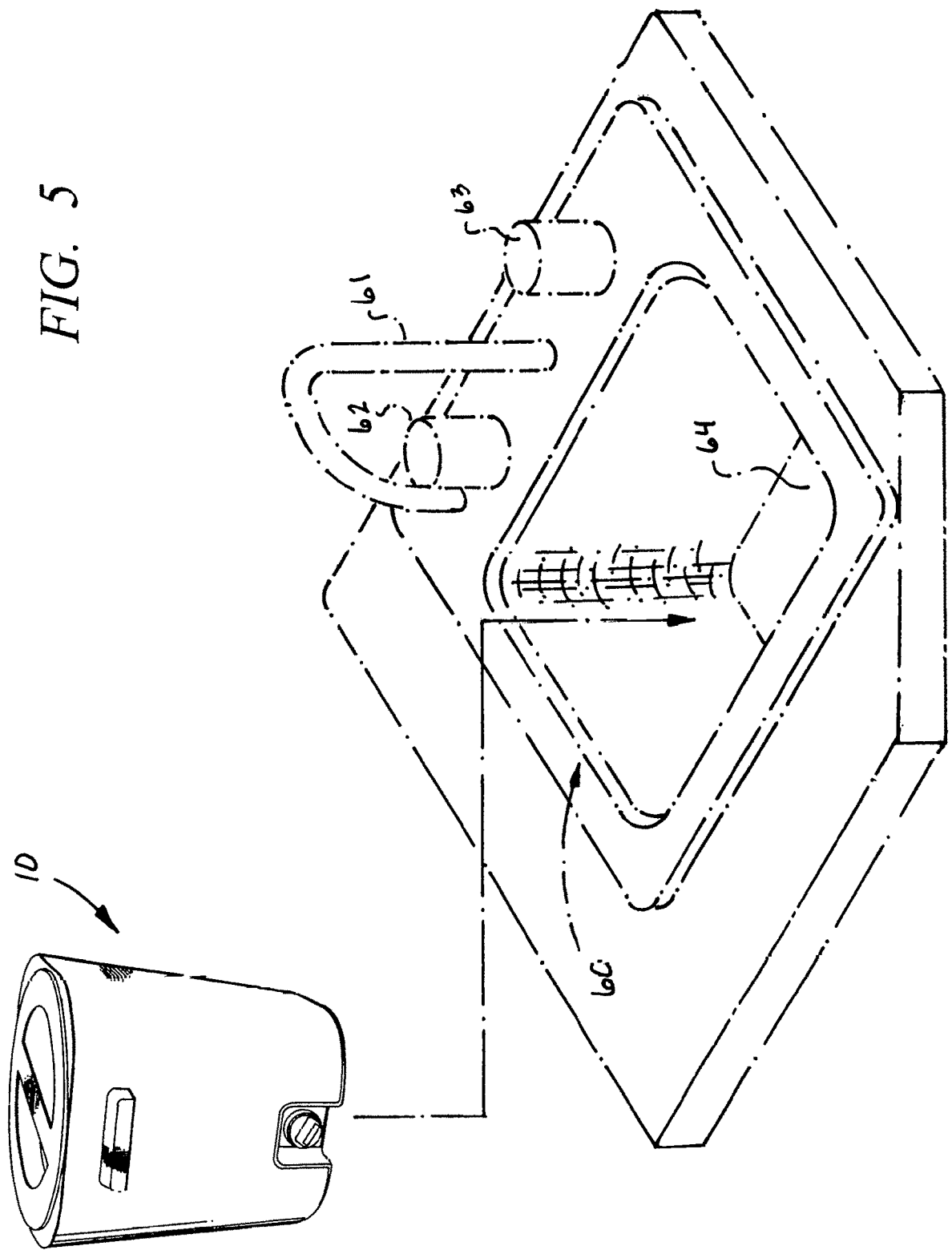
FIG. 5 is a perspective view further illustrating brining apparatus constructed in accordance with the invention.

Sink 60 in FIG. 5 includes, in conventional fashion, a drain (not visible) in the bottom 64 of sink 60, faucet 61, and valves 62 and 63 to control the flow of fluid through faucet 61. Moisturizing apparatus 10 is shaped and dimensioned such that it can be set in sink 60 with bottom 20 (FIG. 1) contacting bottom 64 (FIG. 5). This is a critical feature of the invention because it permits brining fluid to be drained from apparatus 10 in the sink, and permits a turkey or other foodstuff to be removed from apparatus 10 while apparatus 10 is in sink 60 instead of on a counter top or on a floor where drippings from the turkey likely will fall on the counter top or floor.

While the size of opening which is produced when valve 15 is opened can vary, another critical feature of the invention is to ensure that brining fluid containing spices, or other condiments or additives, will easily flow through an open valve 15. As a result, the channel which extends from the interior of housing 11 and through valve 15 preferably has an inner diameter which is, at its smallest cross-section, at least ¾" in diameter, preferably at least 1" in diameter, more preferably at least 1¼" in diameter, and most preferably at least 1½" in diameter. The construction of valve 15 can vary as desired, and can, for example, simply comprise a plug which is pulled out to open the valve and is pushed back in to close the valve. More preferred, however, is a valve which remains in hosing 11 and is simply manually turned between open and closed positions.

Standard sized household refrigerators which have a freezer compartment extending completely across the top or bottom typically have exterior dimensions including a 23" to 36" width, a depth of 24" to 33", and a height of 65" to 69". Such refrigerators have 7.5 to 18 cubic feet of storage in the refrigerator portion, and have an overall storage (including the freezer and refrigerator) of 10 to 25 cubic feet.

Standard sized household refrigerators which have "side-by-side" vertically extending freezer and refrigerator compartments typically have exterior dimensions including a 30 to 36" width, a 67 to 70" height, and a depth of 29 to 35". Such refrigerators have a total storage volume (freezer and refrigerator) of 22.5 to 31 cubic feet, and have a refrigerator storage of 14.5 to 20 cubic feet. The side and back walls of a refrigerator typically are comprised of fiberglass insulation sandwiched between thin metal or polymer inner and outer walls. The side and back walls of a standard sized refrigerator typically are from 0.5 to 2.5 inches thick. While the shape and dimension of moisturizing apparatus 10 (with or without extension 11A) can vary as desired, apparatus constructed in accordance with the invention is normally shaped and dimensioned to fit in a standard sized refrigerator.

By way of further example, a standard medium sized household refrigerator has size walls which are 2.125 inches thick and has an interior space which is 36 inches high, is 28 inches wide and is 25 inches deep. The door of the refrigerator has, however, shelves which extend out 5 inches. Consequently, when the door is closed, the available interior space is 20 inches deep, and not 25 inches deep. The exterior dimensions of the refrigerator are 33 inches wide by 65.5 high by 30 inches deep.

The front to back dimensions of most standard household kitchen sinks remains constant due the size of most cabinets and counter tops, i.e., are about 22 inches from front to back. In contrast, single bowl sinks come widths (side-to-side) of up to 33 inches; double bowls can have a width up to 48 inches; and triple bowls can have a width of up to 60 inches. The depth of kitchen sinks typically is in the range of 8-10 inches. While the shape and dimension of moisturizing apparatus 10 (with or without extension 11A) can, as noted, vary as desired, apparatus 10 constructed in accordance with the invention is normally shaped and dimensioned to fit in a standard sized kitchen sink and therefor has at least one dimension (front-to-back, or, side-to-side) which is less than about 22 inches.

By way of further example, the interior space in one standard household kitchen sink is 29 inches wide, is about 14 inches from the front to the back of the sink, and is about 8 inches deep. A rib, or divider, in the sink divides the sink into two equal portions each having a width of about 13 inches.

Moisturizing apparatus 10 can include a spacer which normally floats on brining liquid in apparatus 10 and/or sets on an exposed portion of a turkey floating in the brining liquid, but which, when apparatus 10 is substantially filled with brining fluid and a turkey, is contacted and then (in order to completely submerge the turkey in brining fluid) pressed or forced downwardly by cover 14 a selected distance into the brining fluid when cover 14 is turned into mouth 16 or 18.

A standard household dishwasher has exterior dimensions of about 24 inches wide, 24 inches deep and 35 inches high. The inner dimensions are somewhat less due to the wall thickness, feet, etc. of the dishwasher. While the shape and dimension of moisturizing apparatus 10 (with or without extension 11 A) can, as noted, vary as desired, apparatus 10 constructed in accordance with the invention is normally shaped and dimensioned to that housing 11 will fit in a standard dishwasher (at least by itself without extension 11A or cover 14), extension 11A will fit in a standard dishwater (at least by itself without housing 11 or cover 14), and cover 14 will bit in a standard dishwasher (at least by itself without housing 11 or extension 11A). As used herein, a standard dishwasher has two "drawers", an upper drawer for glasses, bowls, and items of less height, and a lower drawer spaced downwardly away from the upper drawer to hold dinner plates and larger items. As used herein, housing 10, extension 11A, and cover 14 fit in a standard dishwasher if it at least will fit in the lowest tray after the upper tray(s) is removed. While the shape and dimension of moisturizing apparatus 10 (with or without extension 11A) can, as noted, vary as desired, a housing 11, extension 11A, and cover 14 each are normally shaped and dimensioned to fit in a standard sized dish washer at least after the upper tray(s) is removed.

By way of further example, one standard household dishwasher has a lower shelf and an upper shelf, each of which rolls in and out of the interior of the dishwasher. Each shelf is about twenty and one-half inches wide and twenty-one inches deep. If the top shelf is removed, the distance from the bottom of the lower shelf to the ceiling on the interior of the dishwasher is about twenty-two inches.

The ability to insert (at least separately) housing 11, extension 11A, and cover 14 in a dishwasher is a critical feature of the invention because it permits apparatus constructed in accordance with the invention readily to be sanitized.

While the shape and dimension of apparatus 10 (or 40) can vary as desired, in order to enable apparatus 10 to fit in a standard refrigerator 50, a sink 60, and a standard dishwasher, apparatus 10 (without extension 11A and when in the upright orientation of FIG. 1) presently preferably has a height (from top to bottom 20 when cover 14 is turned into housing 11 in the manner illustrated in FIG. 1) in the range of 7-12 inches, a width (for side to side) in the range of 10-15 inches, and a depth (from front to back) in the range of 10-15 inches. Extension 11A (when in the upright orientation of FIG. 2) presently preferably has a height (from top to bottom) in the range of 6-10 inches, a width (from side to side) in the range of 10-15 inches, and a depth (from front to back) in the range of 10-15 inches. As used herein, a "width" dimension is substantially normal to a "depth dimension", and, width dimensions and depth dimension lie in a horizontal plane while a "height" dimension lies in a vertical plane.

In use, apparatus 10 (or 40) is placed in the upright, free standing orientation illustrated in FIG. 1 without cover 14 inserted in mouth 16. Apparatus 10 is charged with brining liquid and a turkey. A spacer is, if desired, placed in apparatus 10 on top of the brining liquid and turkey. The spacer is shaped and dimensioned such that cover 14, when turned into mouth 16, contacts and downwardly displaces the spacer to submerge the entire turkey in the brining fluid. Cover 14 is sealingly turned into opening 16. Apparatus 10 is placed in a selected open space in refrigerator 50 or other cool area for a selected period of time, or apparatus can be charged with ice. Apparatus 10 is removed from refrigerator 50 and placed in sink 60. Valve 15 is opened to drain brining fluid from housing 11 into sink 60 and down the drain of sink 60. The turkey is removed from housing 11. The turkey may, if desired, be rinsed with water from faucet 61 prior to being removed from housing 11. If desired, the turkey can be removed before brining fluid is drained from housing 11. Housing 11 (and if possible, cover 14) is placed in a dishwasher and the dishwasher is operated to clean and sanitize housing 11. Cover 14 is placed in a dishwasher and the dishwasher is operated to clean and sanitize cover 14. A similar procedure is, as expected, followed when apparatus 40 is utilized.

Having described my invention in such terms as to enable those skilled in the art to understand and practice it, and having described presently preferred embodiments thereof, I claim:

1. A food briner comprising:
   a hollow container having a top, a flat closed bottom, and four sides which form an interior, said four sides including opposing left and right sides and opposing front and back sides to form a substantially quadrilateral shape, said container's top including a circular first female threaded opening;
   a hollow extension member including four walls including opposing left and right walls and opposing front and back walls which form a substantially quadrilateral shape which is substantially the same as said container's quadrilateral shape, said extension member further including a male threaded bottom and a top having circular second female threaded opening, said male threaded bottom having male threads sized and aligned to threadably mate to said container's first female threaded opening in a manner that said engagement of said extension member's male threaded bottom to said container's first female threaded opening forms a liquid tight seal and causes said hollow extension member's four walls to align and form contiguous faces with said container's four sides, said second female threaded opening having the same size and shape as said first female threaded opening; and
   a round top having a male threaded edge, said male threaded edge having male threads sized to mate and form a liquid tight seal with first female threaded opening or said second female threaded opening.

2. The food briner of claim 1 further comprising:
   a recess formed into one of said container's four sides, said recess having a depth; and
   a spigot positioned within said recess, said spigot having a valve which selectively opens to allow the flow of liquid within said hollow container to flow through said spigot and close to prevent the flow of liquid through said spigot, said spigot within said recess so that said spigot does not extend beyond said container's side.

3. The food briner of claim 2 wherein said substantially quadrilateral shape formed by said hollow container's four sides is square with said left and right sides and opposing front and back sides being substantially the same, except for one of said sides possessing said recess.

4. The food briner of claim 1 wherein said substantially quadrilateral shape formed by said hollow container's four sides is square with said left and right sides and opposing front and back sides being substantially the same.

* * * * *